(12) United States Patent
Zhu et al.

(10) Patent No.: US 11,405,149 B2
(45) Date of Patent: Aug. 2, 2022

(54) METHODS AND DEVICES FOR DATA RETRANSMISSION

(71) Applicant: Telefonaktiebolaget LM Ericsson (publ), Stockholm (SE)

(72) Inventors: Huaisong Zhu, Beijing (CN); Qianxi Lu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 181 days.

(21) Appl. No.: 16/345,374

(22) PCT Filed: Nov. 3, 2017

(86) PCT No.: PCT/CN2017/109245
§ 371 (c)(1),
(2) Date: Apr. 26, 2019

(87) PCT Pub. No.: WO2018/082638
PCT Pub. Date: May 11, 2018

(65) Prior Publication Data
US 2019/0273581 A1 Sep. 5, 2019

(30) Foreign Application Priority Data

Nov. 4, 2016 (WO) ................. PCT/CN2016/104719

(51) Int. Cl.
*H04L 1/18* (2006.01)
*H04L 5/00* (2006.01)
(Continued)

(52) U.S. Cl.
CPC ................ *H04L 1/189* (2013.01); *H04L 1/18* (2013.01); *H04L 1/188* (2013.01); *H04L 1/1819* (2013.01);
(Continued)

(58) Field of Classification Search
CPC ......... H04L 1/189; H04L 1/18; H04L 1/1819; H04L 1/188; H04L 5/0055; H04W 28/0289; H04W 72/085; H04W 80/02
See application file for complete search history.

(56) References Cited

U.S. PATENT DOCUMENTS 8,605,674 B2   12/2013 Park et al.
2005/0190720 A1*  9/2005 Miyake ................. H04L 47/193
                                                         370/328

(Continued)

FOREIGN PATENT DOCUMENTS

CN    101547070 A    9/2009
CN    102025471 A    4/2011
(Continued)

OTHER PUBLICATIONS

International Search Report and Written Opinion for International Patent Application No. PCT/CN2017/109245, dated Jan. 16, 2018, 7 pages.

(Continued)

*Primary Examiner* — Christopher M Crutchfield
*Assistant Examiner* — Alan L Lindenbaum
(74) *Attorney, Agent, or Firm* — Withrow & Terranova, PLLC

(57) ABSTRACT

Embodiments of the present disclosure relate to methods and devices for data retransmission. In example embodiments, a method implemented in a first device is provided. According to the method, a RLC packet to a second device is transmitted on a RLC layer. It is determined whether an ACK feedback for the RLC packet is received from the second device during a predetermined RLC retransmission period. In response to missing the ACK feedback during the RLC retransmission period, the RLC packet is retransmitted to the second device on the RLC layer, regardless whether a (Continued)

NACK feedback for the previously transmitted RLC packet is received from the second device.

6 Claims, 11 Drawing Sheets

(51) Int. Cl.
  *H04W 28/02* (2009.01)
  *H04W 72/08* (2009.01)
  *H04W 80/02* (2009.01)
(52) U.S. Cl.
  CPC ....... *H04L 5/0055* (2013.01); *H04W 28/0289* (2013.01); *H04W 72/085* (2013.01); *H04W 80/02* (2013.01)

(56) References Cited

U.S. PATENT DOCUMENTS

| | | | |
|---|---|---|---|
| 2006/0003733 A1* | 1/2006 | Chun | H04L 67/322 455/403 |
| 2008/0137689 A1 | 6/2008 | Shiizaki et al. | |
| 2015/0016318 A1* | 1/2015 | Lee | H04L 5/14 370/280 |
| 2015/0372788 A1 | 12/2015 | Xiao et al. | |
| 2018/0083738 A1* | 3/2018 | Yi | H04W 76/27 |

FOREIGN PATENT DOCUMENTS

| | | |
|---|---|---|
| CN | 103532683 A | 1/2014 |
| WO | 2008013580 A1 | 1/2008 |
| WO | 2009136829 A1 | 11/2009 |
| WO | 2016175497 A1 | 11/2016 |

OTHER PUBLICATIONS

Ericsson, "Tdoc R2-081466: Text Proposal for TTI bundling," 3GPP TSG-RAN WG2 #61 bis, Shenzhen, China, Mar. 31-Apr. 4, 2008, 7 pages.

Extended European Search Report for European Patent Application No. 17866988.3, dated May 27, 2020, 11 pages.

First Office Action for Chinese Patent Application No. 201780082330.1, dated May 27, 2021, 36 pages.

* cited by examiner

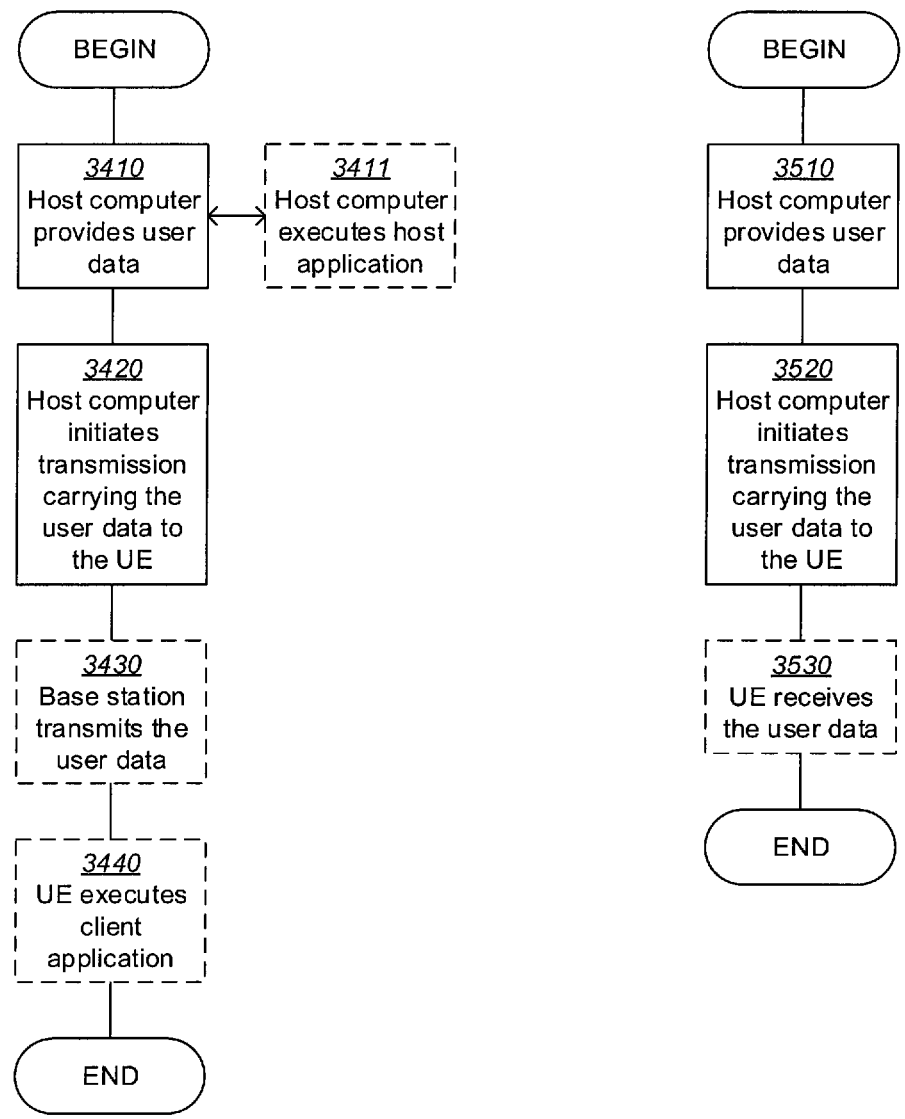
FIG. 16                    FIG. 17

METHODS AND DEVICES FOR DATA RETRANSMISSION

This application is a 35 U.S.C. § 371 national phase filing of International Application No. PCT/CN2017/109245, filed Nov. 3, 2017, which claims the benefit of International Application No. PCT/CN2016/104719, filed Nov. 4, 2016, the disclosures of which are incorporated herein by reference in their entireties.

TECHNICAL FIELD

Embodiments of the present disclosure generally relate to the field of telecommunication, and in particular, to methods and devices for data retransmission.

BACKGROUND

In current telecommunication networks such as Long Term Evolution (LTE) networks based on the 3rd Generation Partnership Project (3GPP) specifications, a data retransmission mechanism is designed to reduce the residual error rate of a data packet. There are two types of retransmission mechanisms, including a Hybrid Automatic Repeat Request (HARQ) process on a Media Access Control (MAC) layer and an Automatic Repeat Request (ARQ) process on a higher Radio Link Control (RLC) layer. In both retransmission mechanisms, depending on whether a data packet is successfully received or not, an acknowledgment (ACK) or negative acknowledgement (NACK) feedback is provided from the receiving side to the transmitting side to trigger retransmission of the data packet. Retransmission of a missing or erroneous data packet is first handled by HARQ mechanism on the MAC layer. The ARQ mechanism at the HARQ layer can be used to complement the HARQ.

The HARQ and ARQ retransmission mechanisms have their own advantages and disadvantages in reliability and latency. Since the AQR process involves a higher layer (the RLC layer) than the HARQ process, the latency is large but the both the data packet and the ACK/NACK feedback can be transmitted with relative low reliability. The HARQ process at the MAC layer targets at fast retransmission but sacrifices the reliability. In some cases, the ACK/NACK feedback for the HARQ process is transmitted by common channels such as physical control channels and thus the residual error rate of the HARQ process depends on robustness of the common channels, which is relatively high.

Reliability and latency are two important aspects for evaluating the quality of service (QoS) of data transmission but it is difficult to achieve high reliability and low latency at the same time in the HARQ and ARQ retransmission mechanisms. To meet the high requirement for one of the two aspects, the other aspect may be traded off as analyzed. This kind of tradeoff is acceptable for many traditional use cases.

However, in current standardization work of the 3GPP, New Radio (NR) techniques have been proposed, which brings new challenges. Many new emerging services such as ultra-reliable and low-latency communication (URLLC) services in NR networks requires both high reliability and low latency to provide high QoS. For example, according to the 3GPP technical reports, the latency requirements for URLLC services range from 1 ms to 10 ms for different concert applications such as automation applications, smart grids, and intelligent transportation, while in the aspect of reliability, it is required to reach a residual error rate of $10^{-4}$, $10^{-6}$, or even $10^{-9}$. It is noted that in the context of such services, in calculation of the residual error rate, a data packet that is received later than the required latency bound of 1 ms or 10 ms is regarded as an error or invalid.

SUMMARY

In general, example embodiments of the present disclosure provide methods and devices for data retransmission.

In a first aspect, there is provided a method implemented in a first device. According to the method, a RLC packet to a second device is transmitted on a RLC layer. It is determined whether an ACK feedback for the RLC packet is received from the second device during a predetermined RLC retransmission period. In response to missing the ACK feedback during the RLC retransmission period, the RLC packet is retransmitted to the second device on the RLC layer, regardless whether a NACK feedback for the previously transmitted RLC packet is received from the second device.

In some embodiments, transmitting the RLC packet to the second device comprises: transmitting the RLC packet from the RLC layer to a MAC layer; generating, on the MAC layer, a MAC packet from the RLC packet; and repeatedly transmitting the MAC packet on the MAC layer to the second device for a predetermined number of times, without waiting for a NACK feedback for a previous transmission of the MAC packet from the second device.

In some embodiments, repeatedly transmitting the MAC packet comprises: selecting, at the RLC layer, one or more MAC entities from a plurality of MAC entities of the first device on the MAC layer; and instructing the selected one or more MAC entities on the MAC layer to repeatedly transmit the MAC packet to the second device for the predetermined number of times.

In some embodiments, the one or more MAC entities are selected from the plurality of MAC entities based on one or more of: qualities of connections between the respective plurality of MAC entities of the first device and a further MAC entity of the second device, traffic loads on the connections, or a latency requirement for the RLC packet.

In some embodiments, the one or more MAC entities are selected from the plurality of MAC entities based on an indication of the one or more MAC entities from the second device.

In some embodiments, the method further includes transmitting an indication of the predetermined number of times to the MAC layer.

In a second aspect, there is provided a method implemented in a second device. The method includes detecting, on a RLC layer, whether a RLC packet is successfully received from a first device; and in response to failing to successfully receive the RLC packet, detecting the RLC packet from the first device on the RLC layer, without transmitting a NACK feedback for the RLC packet to the first device.

In some embodiments, the method further includes in response to successfully receiving the RLC packet, comparing a time length of a time interval from the receipt of the RLC packet to an expiration of a predetermined RLC retransmission period with a threshold time length; and in response to determining that the time length of the time interval is greater than the threshold time length, transmitting an acknowledgment, ACK, feedback for the RLC packet to the first device.

In some embodiments, detecting the RLC packet from the first device comprises: detecting, on a MAC layer, whether a MAC packet are successfully received, wherein the MAC packet is generated from the RLC packet and repeatedly transmitted on a MAC layer for a predetermined number of times; in response to successfully receiving the MAC packet, transmitting the MAC packet from the MAC layer to the RLC layer, without transmitting an ACK feedback for the MAC packet to the first device; and generating, on the RLC layer, the RLC packet based on the MAC packet.

In some embodiments, the method further includes in response to failing to successfully receipt of the MAC packet, detecting a retransmission of the MAC packet on the MAC layer, without transmitting a NACK feedback for the MAC packet to the first device.

In a third aspect, there is provided a method implemented in a RLC device. The method includes transmitting, by the RLC device, a RLC packet to a MAC device; determining whether an ACK feedback for the RLC packet is received from the MAC device during a predetermined RLC retransmission period; and in response to missing the ACK feedback during the RLC retransmission period, retransmitting, by the RLC device, the RLC packet to the MAC device, regardless whether a NACK feedback for the RLC packet is received from the MAC device.

In some embodiments, transmitting the RLC packet to the MAC device comprises: selecting, by the RLC device, the MAC device from a plurality of candidate MAC devices based on one or more of: quality of a connection between the MAC device and a further MAC device that receives the RLC packet, a traffic load on the connection, or a latency requirement for the RLC packet; and transmitting the RLC packet to the selected MAC device.

In some embodiments, the method further includes transmitting, by the RLC device, an indication of a predetermined number of times to the MAC device for retransmission of the RLC packet.

In a fourth aspect, a method implemented in a MAC device is provided. The method includes receiving, by the MAC device, a RLC packet from a RLC device; generating, by the MAC device, a MAC packet from the RLC packet; and repeatedly transmitting, by the MAC device, the MAC packet to a further MAC device for a predetermined number of times, without waiting for a NACK feedback for a previous transmission of the MAC packet from the further MAC device.

In some embodiments, the method further includes receiving, by the MAC device, an indication of the predetermined number of times from the RLC device.

In a fifth aspect, there is provided an apparatus at a first device. The apparatus includes a processor; and a memory coupled to the processing unit and storing instructions thereon, the instructions, when executed by the processing unit, causing the apparatus to: transmit, on a RLC layer, a RLC packet to a second device; determine whether an ACK feedback for the RLC packet is received from the second device during a predetermined RLC retransmission period; and in response to missing the ACK feedback during the RLC retransmission period, retransmitting the RLC packet to the second device on the RLC layer, regardless whether a NACK feedback for the previously transmitted RLC packet is received from the second device.

In some embodiments, the instructions, when executed by the processing unit, cause the apparatus to: transmit the RLC packet from the RLC layer to a MAC layer; generate, on the MAC layer, a MAC packet from the RLC packet; and repeatedly transmit the MAC packet on the MAC layer to the second device for a predetermined number of times, without waiting for a NACK feedback for a previous transmission of the MAC packet from the second device.

In some embodiments, the instructions, when executed by the processing unit, cause the apparatus to: select, at the RLC layer, one or more MAC entities from a plurality of MAC entities of the first device on the MAC layer; and instruct the selected one or more MAC entities on the MAC layer to repeatedly transmit the MAC packet to the second device for the predetermined number of times.

In some embodiments, the one or more MAC entities are selected from the plurality of MAC entities based on one or more of: qualities of connections between the respective plurality of MAC entities of the first device and a further MAC entity of the second device, traffic loads on the connections, or a latency requirement for the RLC packet.

In some embodiments, the one or more MAC entities are selected from the plurality of MAC entities based on an indication of the one or more MAC entities from the second device.

In some embodiments, the instructions, when executed by the processing unit, further cause the apparatus to: transmitting an indication of the predetermined number of times to the MAC layer.

In a sixth aspect, there is provided an apparatus at a second device. The apparatus includes a processor; and a memory coupled to the processing unit and storing instructions thereon, the instructions, when executed by the processing unit, causing the apparatus to: detect, on a RLC layer, whether a RLC packet is successfully received from a first device; and in response to failing to successfully receive the RLC packet, detect the RLC packet from the first device on the RLC layer, without transmitting a NACK feedback for the RLC packet to the first device.

In some embodiments, the instructions, when executed by the processing unit, further cause the apparatus to: in response to successfully receiving the RLC packet, compare a time length of a time interval from the receipt of the RLC packet to an expiration of a predetermined RLC retransmission period with a threshold time length; and in response to determining that the time length of the time interval is greater than the threshold time length, transmit an acknowledgment, ACK, feedback for the RLC packet to the first device.

In some embodiments, the instructions, when executed by the processing unit, cause the apparatus to: detect, on a MAC layer, whether a MAC packet are successfully received, wherein the MAC packet is generated from the RLC packet and repeatedly transmitted on a MAC layer for a predetermined number of times; in response to successfully receiving the MAC packet, transmit the MAC packet from the MAC layer to the RLC layer, without transmitting an ACK feedback for the MAC packet to the first device; and generate, on the RLC layer, the RLC packet based on the MAC packet.

In some embodiments, the instructions, when executed by the processing unit, further cause the apparatus to: in response to failing to successfully receipt of the MAC packet, detect a retransmission of the MAC packet on the MAC layer, without transmitting a NACK feedback for the MAC packet to the first device.

In a seventh aspect, there is provided an apparatus at a RLC device. The apparatus includes a processor; and a memory coupled to the processing unit and storing instructions thereon, the instructions, when executed by the processing unit, causing the apparatus to: transmit a RLC packet to a MAC device; determine whether an ACK feedback for the RLC packet is received from the MAC device during a predetermined RLC retransmission period; and in response to missing the ACK feedback during the RLC retransmission period, retransmit the RLC packet to the MAC device, regardless whether a NACK feedback for the RLC packet is received from the MAC device.

In some embodiments, the instructions, when executed by the processing unit, cause the apparatus to: select the MAC device from a plurality of candidate MAC devices based on one or more of: quality of a connection between the MAC device and a further MAC device that receives the RLC packet, a traffic load on the connection, or a latency requirement for the RLC packet; and transmit the RLC packet to the selected MAC device.

In some embodiments, the instructions, when executed by the processing unit, further cause the apparatus to: transmit an indication of a predetermined number of times to the MAC device for retransmission of the RLC packet.

In an eighth aspect, there is provided an apparatus at a MAC device. The apparatus includes a processor; and a memory coupled to the processing unit and storing instructions thereon, the instructions, when executed by the processing unit, causing the apparatus to: receive a RLC packet from a RLC device; generate a MAC packet from the RLC packet; and repeatedly transmit the MAC packet to a further MAC device for a predetermined number of times, without waiting for a NACK feedback for a previous transmission of the MAC packet from the further MAC device.

In some embodiments, the instructions, when executed by the processing unit, further cause the apparatus to: receive an indication of the predetermined number of times from the RLC device.

In a ninth aspect, there is provided a computer program product that is tangibly stored on a computer readable storage medium. The computer program product includes instructions which, when executed on at least one processor, cause the at least one processor to carry out the method according to any of the first, second, third, and fourth aspects.

In a tenth aspect of the disclosure, there is provided a communication system including a host computer. The communication system comprises processing circuitry configured to provide user data; and a communication interface configured to forward the user data to a cellular network for transmission to a user equipment (UE). The cellular network comprises a base station having a radio interface and processing circuitry, the base station's processing circuitry configured to carry out the method according to any of the first, third, and fourth aspects of the disclosure.

In an eleventh aspect of the disclosure, there is provided a method implemented in a communication system including a host computer, a base station and a user equipment (UE). The method comprises at the host computer, providing user data; and at the host computer, initiating a transmission carrying the user data to the UE via a cellular network comprising the base station, wherein the base station is configured to carry out the method according to any of the first, third, and fourth aspects of the disclosure.

In a twelfth aspect of the disclosure, there is provided a communication system including a host computer. The communication system comprises processing circuitry configured to provide user data; and a communication interface con-figured to forward user data to a cellular network for transmission to a user equipment (UE). The UE comprises a radio interface and processing circuitry, the UE's processing circuitry configured to carry out the method according to the second aspect of the disclosure.

In a thirteenth aspect of the disclosure, there is provided a method implemented in a communication system including a host computer, a base station and a user equipment (UE). The method comprises at the host computer, providing user data; and at the host computer, initiating a transmission carrying the user data to the UE via a cellular network comprising the base station, wherein the UE is configured to carry out the method according to the second aspect of the disclosure.

In a fourteenth aspect of the disclosure, there is provided a communication system including a host computer. The communication system comprises a communication interface configured to receive user data originating from a transmission from a user equipment (UE) to a base station, wherein the UE comprises a radio interface and processing circuitry, and the UE's processing circuitry is configured to carry out the method according to the first, third, and fourth aspects of the disclosure.

In a fifteenth aspect of the present disclosure, there is provided a method implemented in a communication system including a host computer, a base station and a (UE). The method comprises: at the host computer, receiving user data transmitted to the base station from the UE, wherein the UE is configured to carry out the method according to the first, third, and fourth aspects of the disclosure.

In a sixteenth aspect of the present disclosure, there is provided a communication system including a host computer. The communication system comprises a communication interface configured to receive user data originating from a transmission from a (UE) to a base station, wherein the base station comprises a radio interface and processing circuitry, and the base station's processing circuitry is configured to carry out the method according to the second aspect of the disclosure.

In a seventeenth aspect of the present disclosure, there is provided a method implemented in a communication system including a host computer, a base station and a (UE). The method comprises: at the host computer, receiving, from the base station, user data originating from a transmission which the base station has received from the UE, wherein the base station is configured to carry out the method according to the second aspect of the disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIGS. 16 to 19 are flowcharts illustrating methods implemented in a communication system including a host computer, a base station and a user equipment.

Throughout the drawings, the same or similar reference numerals represent the same or similar element.

DETAILED DESCRIPTION

Figure 1:
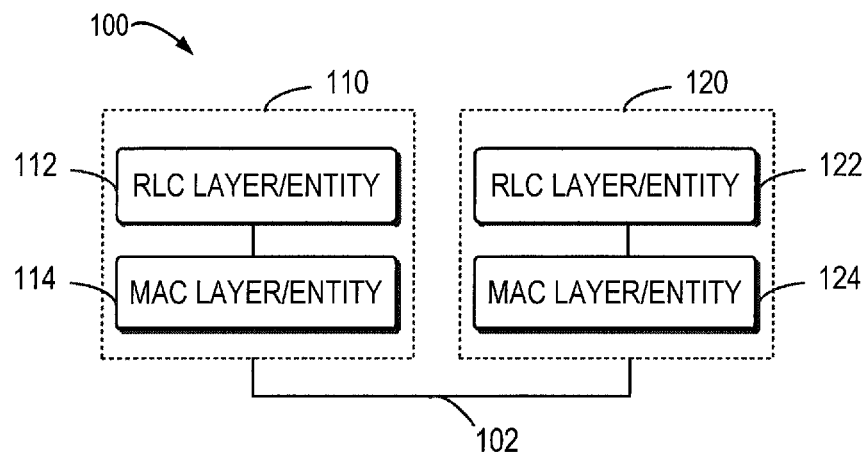
FIG. 1 is a block diagram of a communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" or "user equipment" (UE) refers to any device having wireless or wired communication capabilities. Examples of the terminal device include, but not limited to, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 shows an example communication network 100 in which embodiments of the present disclosure can be implemented. In the network 100, a first device 110 and a second device 120 are communicated with each other via a wired or wireless connection 102. A wireless interface protocol stack is implemented in both the first and second devices 110 and 120. The first device 110 includes an upper Radio Link Control (RLC) layer 112 and a Media Access Control (MAC) layer 114, while the second device 120 also includes a corresponding RLC layer 122 and a MAC layer 124. It would be appreciated that the RLC and MAC layers 112 and 114 are shown for illustration.

Depending on the communication standards or specifications conformed by the network 110, the first or second device 110 or 120 may include other protocol layers such as a Packet Data Convergence Protocol (PDCP) layer upper than the RLC layer or a physical (PHY) layer lower than the MAC layer. During data communication, if the first device 110 has a packet to be transmitted to the second device 120, the packet may be transmitted from an upper layer of the first device 110 to a lower layer of the first device 110 and then to the second device 120.

In some embodiments, instead of being implemented in a single device, functions of the RLC layer and the MAC layer may be distributed in separate devices. In such cases, the RLC layer 112 or the RLC layer 122 may also be referred to as a RLC device 112 or a RLC device 122. Similarly, the MAC layer 114 or the MAC layer 124 may be referred to as a MAC device 112 or a MAC device 124. Although deployed separately, the RLC device 112 and the MAC device 114 may work together as in a single device to transmit a packet from a transmitter side at 110 to a receiver side at 120.

In some embodiments, the first device 110 or second device 120 may be implemented as a network device or a terminal device. If the first device 110 is a network device while the second device 120 is a terminal device, the transmission from the first device 110 to the second device 120 is called as downlink transmission. The transmission in an opposite direction is called as uplink transmission.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
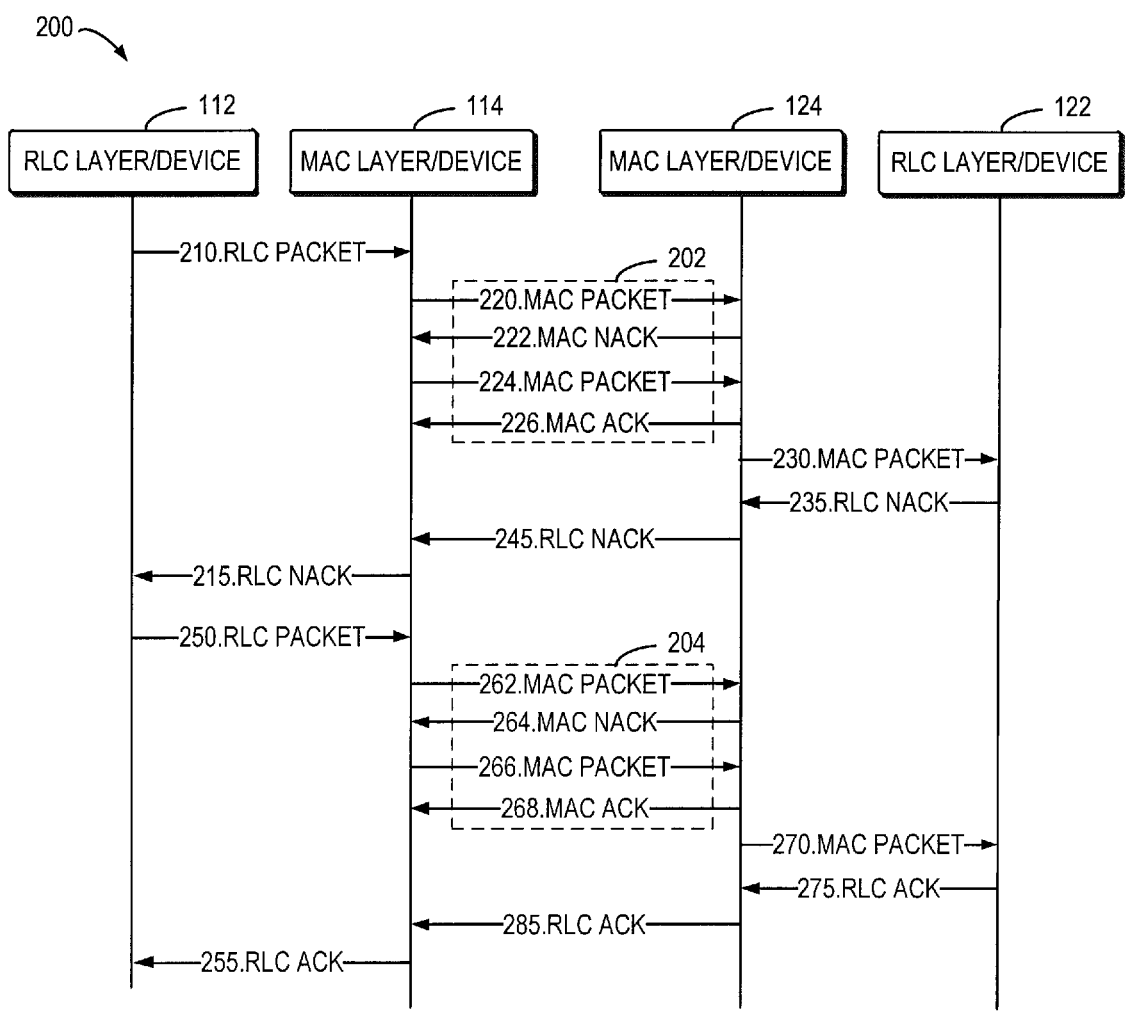
FIG. 2 is a flowchart illustrating a traditional process of data retransmission.

As mentioned above, two retransmission mechanisms of a Hybrid Automatic Repeat Request (HARQ) process and an Automatic Repeat Request (ARQ) process may be applied at the MAC layers/devices 114 and 124 and the RLC layers/devices 112 and 122. FIG. 2 illustrates a traditional process 200 of data retransmission based on HARQ and ARQ. It is supposed that a packet is to be transmitted from the first device 110 to the second device 120. During data transmission, the upper RLC layer/device 112 transmits (210) a packet (referred to as RLC packet) to the MAC layer/device 114. Upon receipt of the RLC packet, the MAC layer/device 114 generates a corresponding MAC packet and transmits (220) the MAC packet to the MAC layer/device 124 at the receiver side. The MAC layer/device 114 waits for a feedback from the MAC layer/device 124 to determine whether a retransmission of the MAC packet is needed.

If the MAC layer/device 124 fails to successfully receive the MAC packet, the MAC layer/device 124 sends (222) a MAC NACK feedback, the MAC layer/device 114 may retransmit the MAC packet until a MAC ACK feedback is received, which indicates that the receiver device 120 has successfully received the packet. Upon receipt of the NACK feedback, the MAC layer/device 114 retransmits (224) the MAC packet to the MAC layer/device 124. Only if the MAC layer/device 124 has successfully received the retransmitted MAC packet, an ACK feedback (referred to as MAC ACK feedback) is sent (226) to the MAC layer/device 114 and the retransmission at the MAC layer/device 114 stops. Otherwise, the MAC layer/device 114 keeps retransmitting the MAC packets until an NACK feedback is received. The retransmission process of 220 to 226 at the MAC layers/devices is called as a HARQ process 202.

The MAC layer/device 124, after receiving a MAC packet, transmits (230) the MAC packet to the RLC layer/device 122. The RLC layer/device 122 generates a RLC packet from the MAC packet and determines whether the RLC packet is correct (for example, by error correction). If the RLC packet is erroneous or if the RLC layer/device 122 fails to obtain any RLC packet after a waiting window from the transmission of the RLC packet, the RLC layer/device 122 transmits a NACK feedback (referred to as RLC NACK feedback) to the RLC layer/device 112. The RLC NACK feedback is first transmitted (235) to the MAC layer/device 124 and then transmitted (245) to the MAC layer/device 114. The MAC layer/device 114 provides (215) the RLC NACK feedback to the RLC layer/device 112.

In the cases where the HARQ process fails to successfully transmit the packet, the ARQ process on the RLC layer/device 112 may be activated. Upon receipt of the RLC NACK feedback, the RLC layer/device 112 recognizes that the transmission of the RCL packet at 210 is failed and triggers the ARQ process to retransmit (250) the RLC packet.

Another HARQ process 204 may be applied on the retransmitted RLC packet at the MAC layer/device 114, where the corresponding MAC packet is retransmitted (262 and 266) for several times. A MAC NACK feedback transmitted (264) from the MAC layer/device 124 triggers the retransmission while a MAC ACK feedback transmitted (268) from the MAC layer/device 124 enables the MAC layer/device 114 to stop the HARQ process. The MAC layer/device 124, after receiving a MAC packet, transmits (270) the MAC packet to the RLC layer/device 122. The RLC layer/device 122 generates a RLC packet from the MAC packet. If the generated RLC packet is considered as correct, the RLC layer/device 122 transmits (275) a RLC ACK feedback for the RLC packet to the MAC layer/device 124 so that this RLC ACK feedback is transmitted (285) to the MAC layer/device 124 and is forwarded (255) to the RLC layer/device 112. Upon receipt of the RLC ACK feedback, the RLC layer/device 112 stops retransmission of the RLC packet.

In traditional ARQ and HARQ processes, retransmission of the RLC packet or MAC packet is dependent on a feedback from the receiver side. As mentioned above, the two retransmission mechanisms of ARQ and HARQ have their own advantages and disadvantages in reliability and latency. In particular, the HARQ process targets at fast retransmission but sacrifices the reliability, while the ARQ process can achieve high reliability but suffer from high latency. For services with high QoS such as URLLC services, if the tightened requirements for both high reliability and low latency rely on retransmissions of the HARQ process, a physical control channel with higher robustness and a lower error rate is needed for transmitting the feedbacks such as ACK or NACK, which is almost impossible from the purely L1 design. On the other hand, if the retransmission is performed on the RLC layer, the latency is too high, which is not feasible for the URLLC services.

In order to at least in part solve the above and other potential problems, embodiments of the present disclosure provide a new solution for data retransmission. In the data retransmission, a RLC layer at a transmitter side performs autonomous and blind retransmission. Specifically, instead of retransmitting a RLC packet upon receipt of a NACK feedback from a receiver side, the RLC packet is retransmitted on the RLC layer regardless whether a NACK feedback is received. In this case, a RLC layer at the receiver side can skip the NACK feedback even the RLC packet is not successfully received. Due to the skipping of the NACK feedback, operations such as generation, packetizing, and transmission of the NACK feedback is omitted during the data retransmission, which may increase the Round-Trip Time (RTT) of transmission and thus improve the latency of the ARQ process on the RLC layer.

Figure 3:
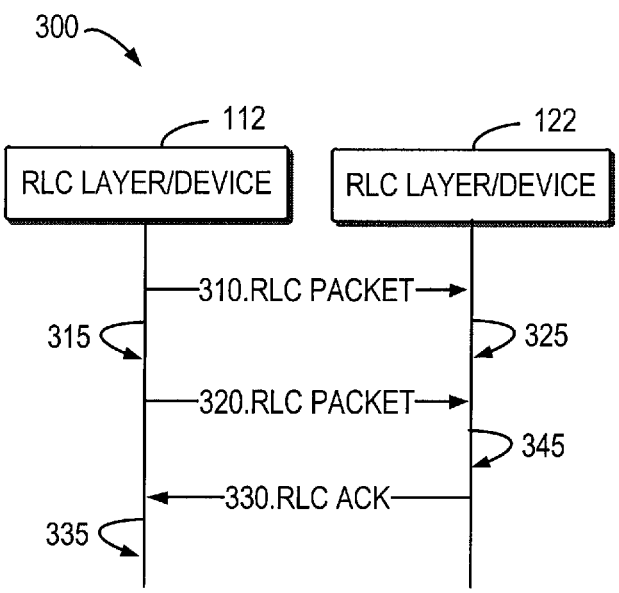
FIG. 3 is a flowchart illustrating a process of data retransmission according to some embodiments of the present disclosure.

Principle and implementations of the present disclosure will be described in detail below with reference to FIG. 3, which shows a process 300 of data retransmission at the RLC layer. For the purpose of discussion, the process 300 will be described with reference to FIG. 1. The process 300 may involve data retransmission on a RLC layer. Thus, the process 300 of data retransmission may be called as an ARQ retransmission process. In embodiments of FIG. 3, the first device 110 has a packet to be transmitted to the second device 120. In this case, the first device 110 acts as a transmitter while the second device 120 acts as a receiver. As shown, the transmission of the packet may involve the RLC layer/device 112 at the transmitter side and the RLC layer/device 122 at the receiver side.

The RLC layer/device 112 transmits (310) a packet (referred to as a RLC packet) to the RLC layer/device 122. The RLC layer/device 112 may receive data of the RLC packet from an upper layer (such as a PDCP layer) of the first device 110 or other device. In some examples, the RLC packet may be a RLC protocol data unit (RLC PDU). According to embodiments of the present disclosure, it is not necessary for the RLC layer/device 112 to wait for receiving a NACK feedback before starting a retransmission of the RLC packet. Therefore, the RLC layer/device 112 may keep retransmitting the RLC packet autonomously without any feedback from the RLC layer/device 122.

One factor to terminate the retransmission on the RLC layer/device 112 is an expiration of a predetermined RLC retransmission period. This is because for those traffics with strict real-time requirement, if latency of a packet is longer than the requirement latency, there is no need to perform any further transmission. The RLC retransmission period defines a period within which the RCL layer/device 112 may retransmit the RLC packet for a number of times. The RLC retransmission period may start from the first time of transmission of the RLC packet on the RLC layer/device 112. The waiting time window between every two times of retransmission may also be configured or determined by the RLC layer/device 112. In some other examples, the waiting time window may be dependent on the transmission resources allocated for the RLC packet transmission.

The RLC layer/device 112 determines (315) whether the RLC retransmission period is expired. If the RLC retransmission period is unexpired, the RLC layer/device 112 retransmits (320) the RLC packet to the RLC layer/device 122 regardless of receiving or without waiting for a NACK feedback from the RLC layer/device 122. In this case, since the retransmission at the RLC layer/device 112 is not triggered by the NACK feedback from the receiver side, the waiting time window of different retransmissions of the RLC packet may be reduced and operations on both the RLC layers/devices 112 and 122 are simplified, which helps to improve the latency of the ARQ retransmission process. In addition, since the ARQ retransmission is performed by the upper RLC layer, then the reliability of the transmission may be maintained at a high level.

In some embodiments, to save transmission resources, the RLC layer/device 112 may stop the retransmission of the RLC packet upon receipt of an ACK feedback from the RLC layer/device 122. The RLC layer/device 112 may further determine whether an ACK feedback for the RLC packet is received from the receiver side (that is, from the RLC layer/device 122). In response to the ACK feedback is not received within the RLC retransmission period, the RLC layer/device 112 retransmits (320) the RLC packet to the RLC layer/device 122.

At the receiver side, although various duplications of the RLC packet are transmitted from the RLC layer/device 112, the RLC layer/device 122 at the receiver side may be able to handle the duplications as a traditional RLC layer/device because each RLC packet is numbered. The RLC layer/device 122 detects (315) if the RLC packet is successfully received from the first device 110 (that is, the RLC layer/device 112). The unsuccessful receipt of the RLC packet may be caused by various factors such as channel errors, decoding errors, and so on. If the RLC layer/device 122 fails to successfully receive the RLC packet, the RLC layer/device 122 may skip the NACK feedback because the RLC layer/device 112 performs blind retransmission. The RLC layer/device 122 continues detecting subsequent retransmissions of the RLC packet from the RLC layer/device 112. In some embodiments, if the RLC layer/device 122 detects (345) successful receipt of the RLC packet, the RLC layer/device 122 transmits (330) an ACK feedback (referred to as a RLC ACK feedback) for the RLC packet to the RLC layer/device 112.

At the transmitter side, the RLC layer/device 112 detects (335) that the RLC retransmission period is expired and/or that the RLC ACK feedback is received and thus stops retransmission of the RLC packet. It would be appreciated that the RLC ACK feedback received by the RLC layer/device 112 may be a feedback to any of the previous transmissions of the RLC packet. That is, the RLC layer/device 112 is allowed to keep retransmitting or stop the retransmitting without waiting for a feedback to the last transmission.

In some embodiments, the RLC layer/device 122 at the receiver side may selectively transmit the ACK feedback even if it has already successfully received the RLC packet. In some cases where the RLC packet received later than a predetermined latency period is regarded as an error or invalid, the RLC layer/device 112 may determine whether the time when the RLC packet is successfully received is near to an expiration of the predetermined RLC retransmission period and transmit the RLC ACK feedback only if it is determined that the RLC retransmission period is not to be expired shortly. In this manner, it is able to avoid unnecessary feedback transmission.

Specifically, the RLC layer/device 112 compares a time length of a time interval from the receipt of the RLC packet to the expiration of the RLC retransmission period with a threshold time length. The threshold time length may be set according to the actual requirement and the transmission rate between the transmitter side and the receiver side. In response to determining that the time length of the time interval is greater than the threshold time length, the RLC layer/device 122 transmits (330 the RLC ACK feedback for the RLC packet to the RLC layer/device 112. Otherwise, this feedback is not transmitted.

In the above process, the RLC packet and the feedback transmitted between the RLC layer/device 112 and the RLC layer/device 122 may be completed via some lower layers of the first and second devices 110 and 120, such as the MAC layers 114 and 124. It would be appreciated that although two times of transmissions of RLC packet is shown in FIG. 3, the RLC layer/device 122 may perform more or less times of transmissions depending on the time length of the RLC retransmission period and on whether the RLC packet is successfully received. In some embodiments where no ACK feedback is required, the ACK feedback at 330 can be omitted. In some embodiments, the RLC ACK/NACK feedback may also be referred to as a status report for the RLC packet, indicating whether the RLC packet is successfully received at the receiver side or not.

Figure 4:
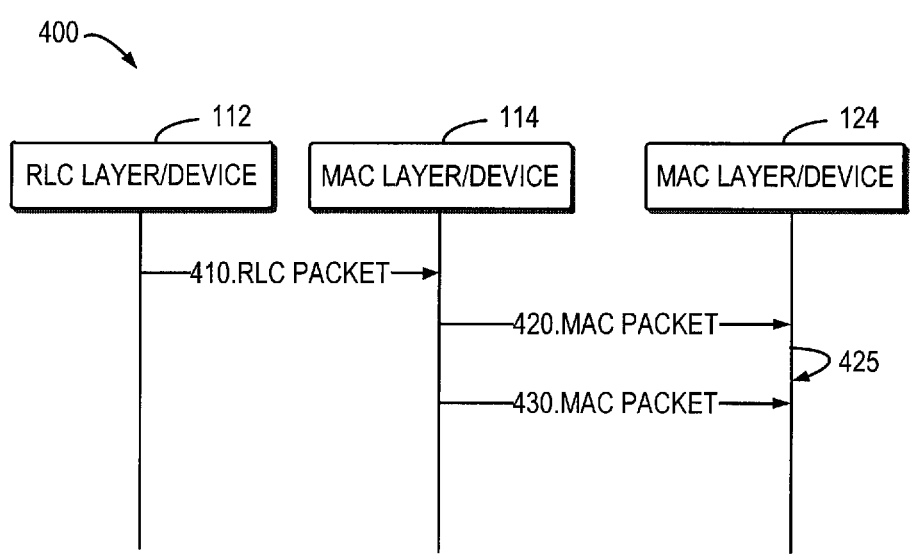
FIG. 4 is a flowchart illustrating a process of data retransmission according to some other embodiments of the present disclosure.

The ARQ process at the RLC layer has been described above with reference to FIG. 3. In some embodiments, for a RLC packet transmitted or retransmitted from the RLC layer/device 112 to the RLC layer/device 122, a corresponding HARQ process at the MAC layer may be performed. FIG. 4 shows another process 400 of data retransmission at the MAC layer. For the purpose of discussion, the process 400 will be described with reference to FIG. 1. Since the process 400 of data retransmission involves the MAC layer, the process 400 may be called as a HARQ retransmission process. In embodiments of FIG. 4, the RLC layer 112 has a RLC packet to be transmitted to the second device 120. Thus, the first device 110 acts as a transmitter while the second device 120 acts as a receiver. As shown, the transmission of the RLC packet may involve the RLC layer/device 112 and the MAC layer/device 114 at the transmitter side and the MAC layer/device 124 at the receiver side.

At the transmitter side, the RLC layer/device 112 transmits (410) a RLC packet to the MAC layer/device 114. Each time the RLC layer/device 112 has a RLC packet to be transmitted to the receiver side, the RLC packet may be provided to the lower MAC layer/device 114. Upon receipt of the RLC packet, the MAC layer/device 114 may perform a HARQ transmission process. The MAC layer/device 114 generates a MAC packet from the RLC packet by applying corresponding processing at this layer. In some embodiments, in generating the MAC packet, the RLC layer/device 114 may segment the RLC packet into a plurality of MAC packets with an appropriate size, concatenate the RLC packet with one or more other RLC packets into a MAC packet, or pad dummy bits or header with the RLC packet to obtain a MAC packet, and the like. The scope of the present disclosure is not limited in this regard. A MAC packet may also be referred to as a MAC service packet unit (MAC SDU) in some examples.

The MAC layer/device 114 transmits (420) the MAC packet to the MAC layer/device 124. If multiple MAC packets are generated, all of the MAC packets may be transmitted. According to embodiments of the present invention, it is not necessary for the MAC layer/device 114 to wait for receiving a NACK feedback before starting a retransmission of the MAC packet. Therefore, the MAC layer/device 114 retransmits (430) the MAC packet without any feedback from the MAC layer/device 124.

In some embodiments, compared with the traditional HARQ process which is triggered by the MAC layer, the retransmission process at the MAC layer/device 114 may be controlled by the RLC layer/device 112. In some embodiments, the RLC layer/device 112 may control how many times the MAC packet is retransmitted at the MAC layer/device 114. If the first device 110 or the separate RLC device 112 is a network device such as a base station, the RLC layer/device 112 or other upper layer/device may transmit an indication of a predetermined number of times for retransmissions to the MAC layer/device 114. In some other cases where the first device 110 or the separate RLC device 112 is a terminal device such as user equipment, the indication of the predetermined number of times may be determined by the base station and is configured to the MAC layer/device 114 via signaling from the corresponding serving base station. The indication of the predetermined number of times may be configured in advance or may be provided if there is a RLC packet to be retransmitted via the MAC layer/device 114. The MAC layer/device 114 may repeatedly transmit (420 and 430) the MAC packet for the predetermined number of times.

In some embodiments, the retransmissions at the MAC layer/device 114 may be triggered by an indication from the RLC layer/device 112 or other upper layer (or an indication from the serving base station if the RLC layer/device 112 is included in a terminal device). For example, in response to any RLC packet from the RLC layer/device 112 or an indication of the predetermined number of times for retransmissions, the MAC layer/device 114 may repeatedly transmit the MAC packet. In some other examples, a dedicated signaling may be provided to the MAC layer/device 114 to trigger the retransmission of the MAC packet.

In some embodiments, the first device 110 may have a plurality of MAC entities on the MAC layer/device 114 and thus the RLC layer/device 112 may select some or all of them to retransmit the MAC packet. As used herein, a MAC entity is corresponding to a connection for communication and may include one or more component carriers, one or more HARQ processes, and/or other elements that can be used for communication. For example, the component carriers may correspond to different connections for communication. If the first device 110 has a plurality of connections with the second device 120, the first device 110 may have a plurality of corresponding MAC entities on the MAC layer/device 114. Such connections may include connections between the first device 110 and different base stations or cells, or different communication networks with different techniques (such as a Wi-Fi connection, a Bluetooth connection, a NR connection, and the like). Likewise, there may be a plurality of MAC entities on the MAC layer/device 124. A MAC entity on the MAC layer/device 114 may have a connection or connections to one or more MAC entities on the MAC layer/device 124. In selecting a MAC entity, a part or all of a component carrier, some or all of its communication elements such as the component carriers or HARQ processes can be selected and used.

In some embodiments, the RLC layer/device 112 may select a MAC entity for transmissions of the MAC packet based on qualities of connections of the MAC entities and/or traffic loads on the connections. The qualities of connections may be determined based on air interface measurements. In one example, the MAC entity with a high quality of connection to a MAC entity on the MAC layer/device 124 and with a low traffic thereon may be selected. In some embodiments, the number of MAC entities to be selected may be based on the latency requirement for the RLC packet. If the latency requirement is strict, more than one MAC entity may be selected. Otherwise, only one MAC entity is selected. If the first device 110 is a terminal device, the selection of the MAC entities may be configured by the base station via an indication such as a radio resource control (RRC) signaling from its serving base station. The MAC layer/device 114 may instruct (or cause) the selected MAC entity or entities to repeatedly transmit the MAC packet. In the cases where two or more MAC entities are selected, the MAC packet may be transmitted simultaneously on those MAC entities to decrease the transmission latency. In some other examples, the MAC packet may be transmitted in sequence on the MAC entities.

At the receiver side, the MAC layer/device 124 detects (425) whether the MAC packet is successfully received. No matter whether the MAC packet is successfully received or not, the MAC layer/device 124 is not required to transmit a MAC ACK/NACK to the MAC layer/device 114. The reason is that the robustness of the channel for transmitting the ACK/NACK feedback is low, which makes the feedback not trustable for the RLC layer/device 112. Thus, in order to save time and transmission resources, the MAC ACK/NACK feedback may be omitted. If the MAC packet is not successfully received, the MAC layer/device 124 may detect a subsequent transmission of the MAC packet without needing to transmit the ACK\NACK feedback. In some embodiments, the ACK/NACK feedback on the MAC layer/device 124 may be disabled by the serving base station of the second device 120 in the cases of downlink transmission.

The HARQ retransmission process at the MAC layer has been described above. During the HARQ retransmission process, the RLC layer/device 112 or 122 may handle the possible out-of-order or duplication detection and discarding on the MAC layer/device 114 or 124. It would be appreciated that although two times of transmissions of MAC packet is shown in FIG. 4, the MAC layer/device 114 may perform more times of transmissions depending on the configured number of retransmission times. The HARQ retransmission process at the MAC layer may be used to assist the ARQ retransmission process at the RLC layer. That is, for each transmitted RLC packet from the RLC layer/device 112, a HARQ retransmission process 400 may be triggered on the MAC layer/device 114. With the assistance of the HARQ retransmission at the MAC layer and the omitting of the MAC feedbacks, the reliability and the latency of the RLC packet may be further improved.

Figure 5:
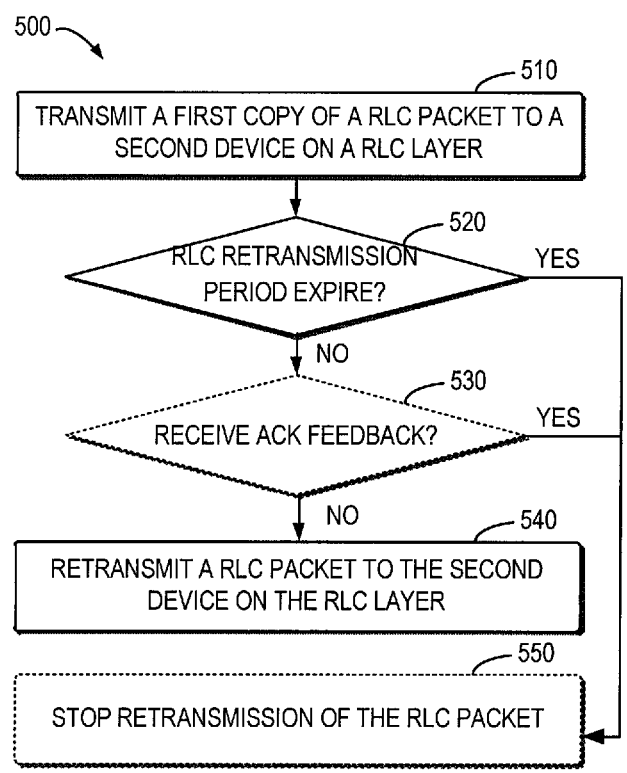
FIG. 5 is a flowchart of a method implemented in a first device in accordance with some embodiments of the present disclosure.

FIG. 5 shows a flowchart of an example method 500 in accordance with some embodiments of the present disclosure. The method 500 can be implemented at the first device 110 as shown in FIG. 1. For the purpose of discussion, the method 500 will be described from the perspective of the first device 110 with reference to FIG. 1 and thus involves the RLC layer 112 and the MAC layer 114 of the first device 110.

At block 510, the first device 110 transmits on a RLC layer 112 a RLC packet to a second device 120. At block 520, the first device 110 determines whether a predetermined RLC retransmission period is expired. If the predetermined RLC retransmission period is unexpired, at block 530, the first device 110 determines whether an ACK feedback is received from the second device 120. If the ACK feedback is not received and the RLC retransmission period is unexpired, at block 540, the first device 110 retransmits the RLC packet to the second device 120 on the RLC layer 112, regardless whether a NACK feedback for the previously transmitted RLC packet is received from the second device 120. If the RLC retransmission period is expired or if the ACK feedback is received from the second device 120, at block 550, the first device 110 stops retransmission of the RLC packet on the RLC layer 112.

It would be appreciated that the order of blocks 520 and 530 may be switched in some embodiments. Moreover, in some embodiments, blocks 530 and/or 550 can be omitted. That is, the first device 110 may retransmit the RLC packet on the RLC layer 112 regardless of an ACK/NACK feedback from the second device 120.

In some embodiments, in transmitting or retransmitting the RLC packet, the first device 110 may transmit the RLC packet from the RLC layer 112 to a MAC layer 114. A MAC packet may be generated from the RLC packet. Then the MAC packet may be repeatedly transmitted on the MAC layer 114 to the second device 120 for a predetermined number of times, without waiting for a NACK feedback for a previous transmission of the MAC packet from the second device 120.

In some embodiments, in repeatedly transmitting the MAC packet on the MAC layer 114, the first device 110 may select, at the RLC layer 112, one or more MAC entities from a plurality of MAC entities of the first device 110 on the MAC layer 114. Then the first device 110, for example, the MAC layer 114 may trigger (or cause) the selected one or more MAC entities to repeatedly transmit the MAC packet to the second device 120 for the predetermined number of times.

In some embodiments, the one or more MAC entities may be selected from the plurality of MAC entities based on one or more of: qualities of connections between the respective plurality of MAC entities of the first device 110 and a further MAC entity of the second device 120, traffic loads on the connections, or a latency requirement for the RLC packet.

In some embodiments, the one or more MAC entities are selected from the plurality of MAC entities based on an indication of the one or more MAC entities from the second device 120.

In some embodiments, the first device 110, for example, the RLC layer 112 or an upper layer may transmit an indication of the predetermined number of times to the MAC layer 114.

Figure 6:
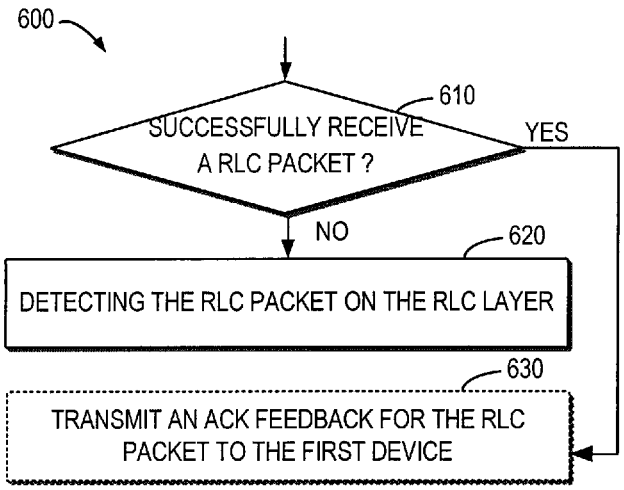
FIG. 6 is a flowchart of a method implemented in a second device in accordance with some embodiments of the present disclosure.

FIG. 6 shows a flowchart of an example method 600 in accordance with some embodiments of the present disclosure. The method 600 can be implemented at the second device 120 as shown in FIG. 1. For the purpose of discussion, the method 600 will be described from the perspective of the second device 120 with reference to FIG. 1 and thus involves the RLC layer 122 and the MAC layer 124 of the second device 120.

At block 610, the second device 120 detects on a RLC layer 122 whether a RLC packet is successfully received from a first device 110. If the second device 120 fails to successfully receive the RLC packet on the RLC layer 122, at block 620, the second device 120 detects the RLC packet from the first device 110 on the RLC layer 122, without transmitting a NACK feedback for the RLC packet to the first device 110.

If the second device 120 successfully receives the RLC packet on the RLC layer 122, at block 630, the second device 120 transmits on the RLC layer 122 an ACK feedback for the RLC packet to the first device 110. In some embodiments, the second device 120 may not transmit the ACK feedback to the first device 110 on the RLC layer 122 even if the RLC packet is successfully received.

In some other embodiments, the second device 120 may selectively transmit the ACK feedback on the RLC layer 122. Specifically, in response to successfully receiving the RLC packet, the second device 120 may compare a time length of a time interval from the receipt of the RLC packet to an expiration of a predetermined RLC retransmission period with a threshold time length. In response to determining that the time length of the time interval is greater than the threshold time length, the second device 120 may transmit an ACK feedback for the RLC packet to the first device 110.

In some embodiments, the second device 120 may detect on the MAC layer 124, whether a MAC packet are successfully received. The MAC packet is generated from the RLC packet and repeatedly transmitted on a MAC layer for a predetermined number of times. In response to successfully receiving the MAC packet, the second device 120 may transmit the MAC packet from the MAC layer 124 to the RLC layer 122, without transmitting an ACK feedback for the MAC packet to the first device 110. The second device 120 may generate, on the RLC layer 122, the RLC packet based on the MAC packet.

In some embodiments, in response to failing to successfully receipt of the MAC packet, the second device 120 may detect a retransmission of the MAC packet on the MAC layer 124, without transmitting a NACK feedback for the MAC packet to the first device 110.

Figure 7:
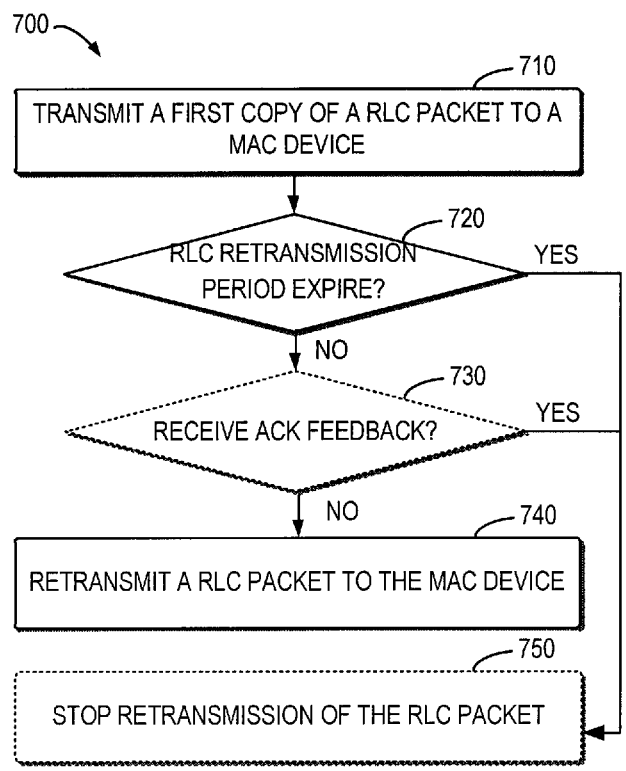
FIG. 7 is a flowchart of a method implemented in a RLC device in accordance with some embodiments of the present disclosure.

FIG. 7 shows a flowchart of an example method 700 in accordance with some embodiments of the present disclosure. The method 700 can be implemented at the RLC layer/device 112 as shown in FIG. 1. For the purpose of discussion, the method 700 will be described from the perspective of the RLC layer/device 112 with reference to FIG. 1.

At block 710, the RLC layer/device 112 transmits a RLC packet to a MAC layer/device 114. At block 720, the RLC layer/device 112 determines whether a predetermined RLC retransmission period is expired. If the predetermined RLC retransmission period is unexpired, at block 730, the RLC layer/device 112 determines whether an ACK feedback is received from the MAC device 114. If the ACK feedback is not received and the RLC retransmission period is unexpired, at block 740, the RLC layer/device 112 retransmits the RLC packet to the MAC device 114, regardless whether a NACK feedback for the previously transmitted RLC packet is received from the second device 120. If the RLC retransmission period is expired or if the ACK feedback is received from the MAC device 114, at block 750, the RLC layer/device 112 stops retransmission of the RLC packet.

It would be appreciated that the order of blocks 720 and 730 may be switched in some embodiments. Moreover, in some embodiments, blocks 730 and/or 750 can be omitted. That is, the RLC layer/device 112 may retransmit the RLC packet regardless of an ACK/NACK feedback from the receiver side.

In some embodiments, the RLC layer/device 112 may select the MAC layer/device 114 from a plurality of candidate MAC devices 114 based on one or more of: quality of a connection between the MAC device 114 and a further MAC device 124 that receives the RLC packet, a traffic load on the connection, or a latency requirement for the RLC packet. The RLC layer/device 112 may transmit the RLC packet to the selected MAC device 114.

In some embodiments, the RLC layer/device 112 may transmit an indication of a predetermined number of times to the MAC device 114 for retransmission of the RLC packet.

Figure 8:
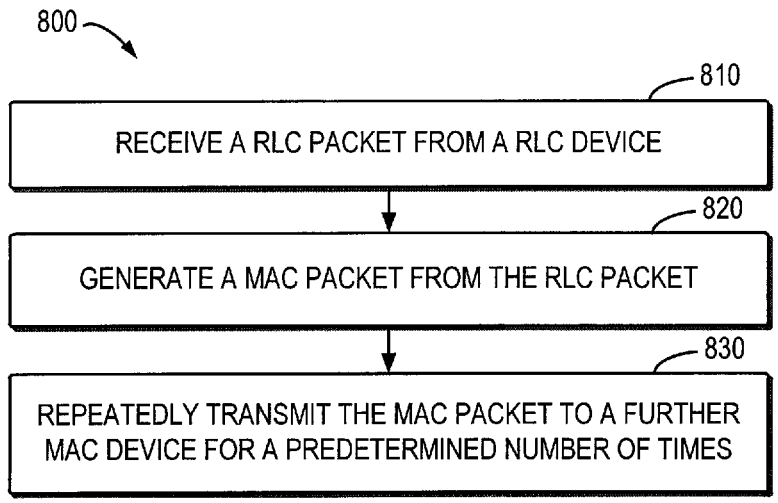
FIG. 8 is a flowchart of a method implemented in a MAC device in accordance with some embodiments of the present disclosure.

FIG. 8 shows a flowchart of an example method 800 in accordance with some embodiments of the present disclosure. The method 800 can be implemented at the MAC layer/device 114 as shown in FIG. 1. For the purpose of discussion, the method 800 will be described from the perspective of the MAC layer/device 114 with reference to FIG. 1.

At block 810, the MAC layer/device 114 receives a RLC packet from a RLC layer/device 112. At block 820, the MAC layer/device 114 generates a MAC packet from the RLC packet. At block 830, the MAC layer/device 114 repeatedly transmits the MAC packet to a further MAC layer/device 124 for a predetermined number of times, without waiting for a NACK feedback for a previous transmission of the MAC packet from the further MAC layer/device 124.

In some embodiments, the MAC layer/device 114 may receive an indication of the predetermined number of times from the RLC layer/device 112.

It is to be understood that all operations and features related to the first device 110, second device 120, or the layer/device in the first or device 110 or 120 described above with reference to FIGS. 3 and 4 are likewise applicable to the methods 500 to 800 and have similar effects. For the purpose of simplification, the details will be omitted.

Figure 9:
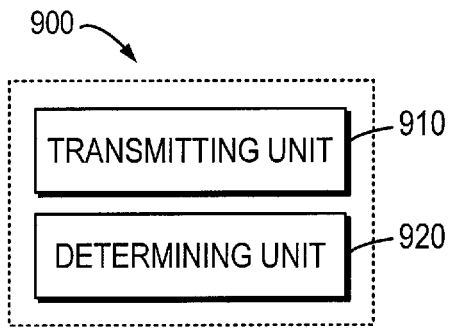
FIG. 9 is a block diagram of a first device in accordance with some embodiments of the present disclosure.

FIG. 9 shows a block diagram of a first device 900 in accordance with some embodiments of the present disclosure. The first device 900 can be considered as an example implementation of the first device 110 as shown in FIG. 1. As shown, the first device 900 includes a transmitting unit 910 configured to transmit, on a RLC layer, a RLC packet to a second device. The first device 900 also includes a determining unit 920 configured to determine whether an ACK feedback for the RLC packet is received from the second device during a predetermined RLC retransmission period. The transmitting unit 910 is further configured to, in response to missing the ACK feedback during the RLC retransmission period, retransmitting the RLC packet to the second device on the RLC layer, regardless whether a NACK feedback for the previously transmitted RLC packet is received from the second device.

In some embodiments, the transmitting unit 910 is configured to transmit the RLC packet from the RLC layer to a MAC layer. The first device 900 further includes a generating unit configured to generate, on the MAC layer, a MAC packet from the RLC packet. The transmitting unit 910 is further configured to repeatedly transmit the MAC packet on the MAC layer to the second device for a predetermined number of times, without waiting for a NACK feedback for a previous transmission of the MAC packet from the second device.

In some embodiments, the first device 900 may include a selecting unit configured to select, at the RLC layer, one or more MAC entities from a plurality of MAC entities of the first device 900 on the MAC layer. The first device 900 may further include an instructing unit configured to instruct the selected one or more MAC entities on the MAC layer to repeatedly transmit the MAC packet to the second device for the predetermined number of times.

In some embodiments, the one or more MAC entities are selected from the plurality of MAC entities based on one or more of: qualities of connections between the respective plurality of MAC entities of the first device and a further MAC entity of the second device, traffic loads on the connections, or a latency requirement for the RLC packet.

In some embodiments, the one or more MAC entities are selected from the plurality of MAC entities based on an indication of the one or more MAC entities from the second device.

In some embodiments, the transmitting unit 910 is further configured to transmit an indication of the predetermined number of times to the MAC layer.

Figure 10:
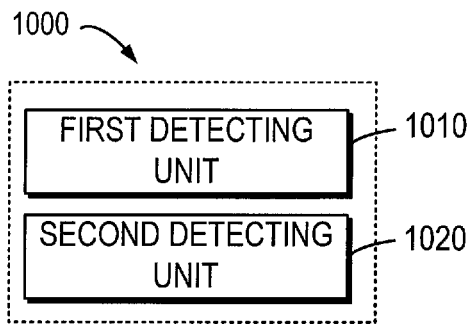
FIG. 10 is a block diagram of a second device in accordance with some embodiments of the present disclosure.

FIG. 10 shows a block diagram of a second device 1000 in accordance with some embodiments of the present disclosure. The second device 1000 can be considered as an example implementation of the second device 120 as shown in FIG. 1. As shown, the second device 1000 includes a first detecting unit 1010 configure to detect, on a RLC layer, whether a RLC packet is successfully received from a first device. The second device 1000 further includes a second detecting unit 1020 configure to, in response to failing to successfully receive the RLC packet, detect the RLC packet from the first device on the RLC layer, without transmitting a NACK feedback for the RLC packet to the first device.

In some embodiments, the second device 1000 may include a comparing unit configured to, in response to successfully receiving the RLC packet, compare a time length of a time interval from the receipt of the RLC packet to an expiration of a predetermined RLC retransmission period with a threshold time length, and a transmitting unit configured to, in response to determining that the time length of the time interval is greater than the threshold time length, transmit an acknowledgment, ACK, feedback for the RLC packet to the first device.

In some embodiments, the second device 1000 may include a third detecting unit configured to detect, on a MAC layer, whether a MAC packet are successfully received, wherein the MAC packet is generated from the RLC packet and repeatedly transmitted on a MAC layer for a predetermined number of times. The transmitting unit may be configured to, in response to successfully receiving the MAC packet, transmit the MAC packet from the MAC layer to the RLC layer, without transmitting an ACK feedback for the MAC packet to the first device. The second device 1000 may include a generating unit configured to generate, on the RLC layer, the RLC packet based on the MAC packet.

In some embodiments, the second device 1000 may include a fourth detecting unit configured to, in response to failing to successfully receipt of the MAC packet, detect a retransmission of the MAC packet on the MAC layer, without transmitting a NACK feedback for the MAC packet to the first device.

Figure 11:
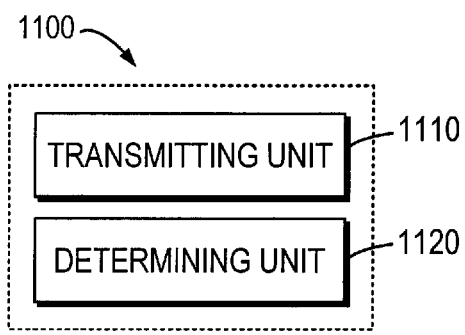
FIG. 11 is a block diagram of a RLC device in accordance with some embodiments of the present disclosure.

FIG. 11 shows a block diagram of a RLC device 1100 in accordance with some embodiments of the present disclosure. The RLC device 1100 can be considered as an example implementation of the RLC layer/device 112 as shown in FIG. 1. As shown, the RLC device 1100 includes a transmitting unit 1110 configured to transmit a RLC packet to a MAC device. The RLC device 1100 also includes a determining unit 1120 configured to determine whether an ACK feedback for the RLC packet is received from the MAC device during a predetermined RLC retransmission period. The transmitting unit 1110 is further configured to, in response to missing the ACK feedback during the RLC retransmission period, retransmit the RLC packet to the MAC device, regardless whether a NACK feedback for the RLC packet is received from the MAC device.

In some embodiments, the RLC device 1100 may include a selecting unit configured to select the MAC device from a plurality of candidate MAC devices based on one or more of: quality of a connection between the MAC device and a further MAC device that receives the RLC packet, a traffic load on the connection, or a latency requirement for the RLC packet. The transmitting unit 1110 is further configured to transmit the RLC packet to the selected MAC device.

In some embodiments, the transmitting unit 1110 is further configured to transmit an indication of a predetermined number of times to the MAC device for retransmission of the RLC packet.

Figure 12:
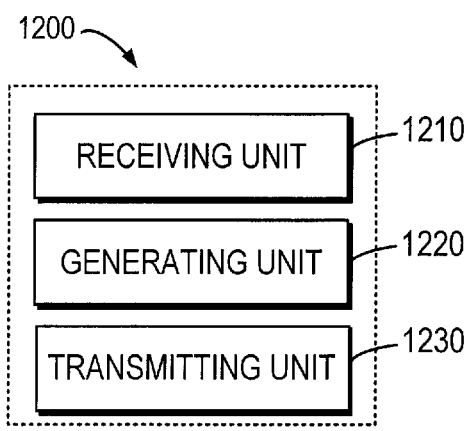
FIG. 12 is a block diagram of a MAC device in accordance with some embodiments of the present disclosure.

FIG. 12 shows a block diagram of a MAC device 1200 in accordance with some embodiments of the present disclosure. The MAC device 1200 can be considered as an example implementation of the MAC layer/device 114 as shown in FIG. 1. As shown, the MAC device 1200 includes a receiving unit 1210 configured to receive a RLC packet from a RLC device, and a generating unit 1220 configured to generate a MAC packet from the RLC packet. The MAC device 1200 also includes a transmitting unit 1230 configured to repeatedly transmit the MAC packet to a further MAC device for a predetermined number of times, without waiting for a NACK feedback for a previous transmission of the MAC packet from the further MAC device.

In some embodiments, the receiving unit 1210 may be configured to receive an indication of the predetermined number of times from the RLC device.

It should be appreciated that units included in the devices 900 to 1200 correspond to the blocks of the processes 300 and 400 as well as the methods 500 to 800. Therefore, all operations and features described above with reference to FIGS. 3 to 8 are likewise applicable to the units included in the devices 900 to 1200 and have similar effects. For the purpose of simplification, the details will be omitted.

The units included in the devices 900 to 1200 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the devices 900 to 1200 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 13:
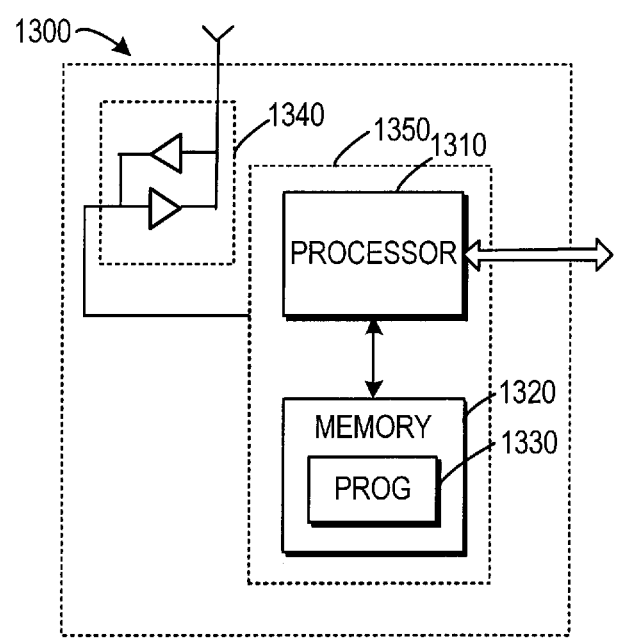
FIG. 13 is a simplified block diagram of a device that is suitable for implementing embodiments of the present disclosure.

FIG. 13 is a simplified block diagram of a device 1300 that is suitable for implementing embodiments of the present disclosure. The device 1300 can be considered as a further example implementation of the first device 110, the second device 120 or the layer/device included in the first or second device 110 or 120 as shown in FIG. 1. Accordingly, the device 1300 can be implemented at or as at least a part of the first device 110, the second device 120 or the layer/device included in the first or second device 110 or 120, respectively.

As shown, the device 1300 includes a processor 1310, a memory 1320 coupled to the processor 1310, a suitable transmitter (TX) and receiver (RX) 1340 coupled to the processor 1310, and a communication interface coupled to the TX/RX 1340. The memory 1310 stores at least a part of a program 1330. The TX/RX 1340 is for bidirectional communications. The TX/RX 1340 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1330 is assumed to include program instructions that, when executed by the associated processor 1310, enable the device 1300 to operate in accordance with the embodiments of the present disclosure, as discussed herein with reference to FIGS. 1 to 7. The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1310 may form processing means 1350 adapted to implement various embodiments of the present disclosure.

The memory 1310 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1310 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

Figure 14:
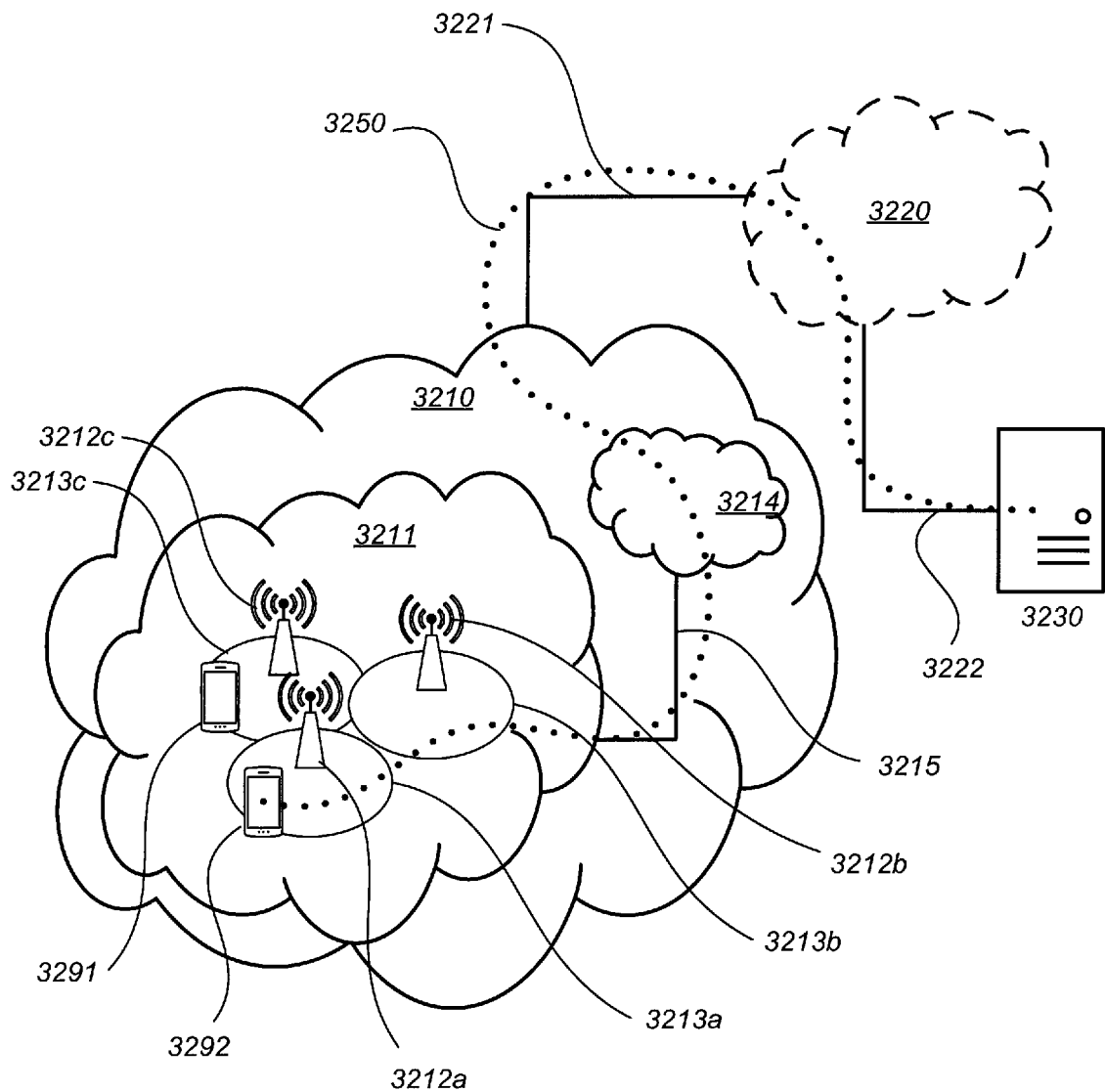
FIG. 14 schematically illustrates a telecommunication network connected via an intermediate network to a host computer.

Another aspect of the present disclosure provides a communication system, an example of which is illustrated in FIG. 14. With reference to FIG. 14, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 15) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 15:
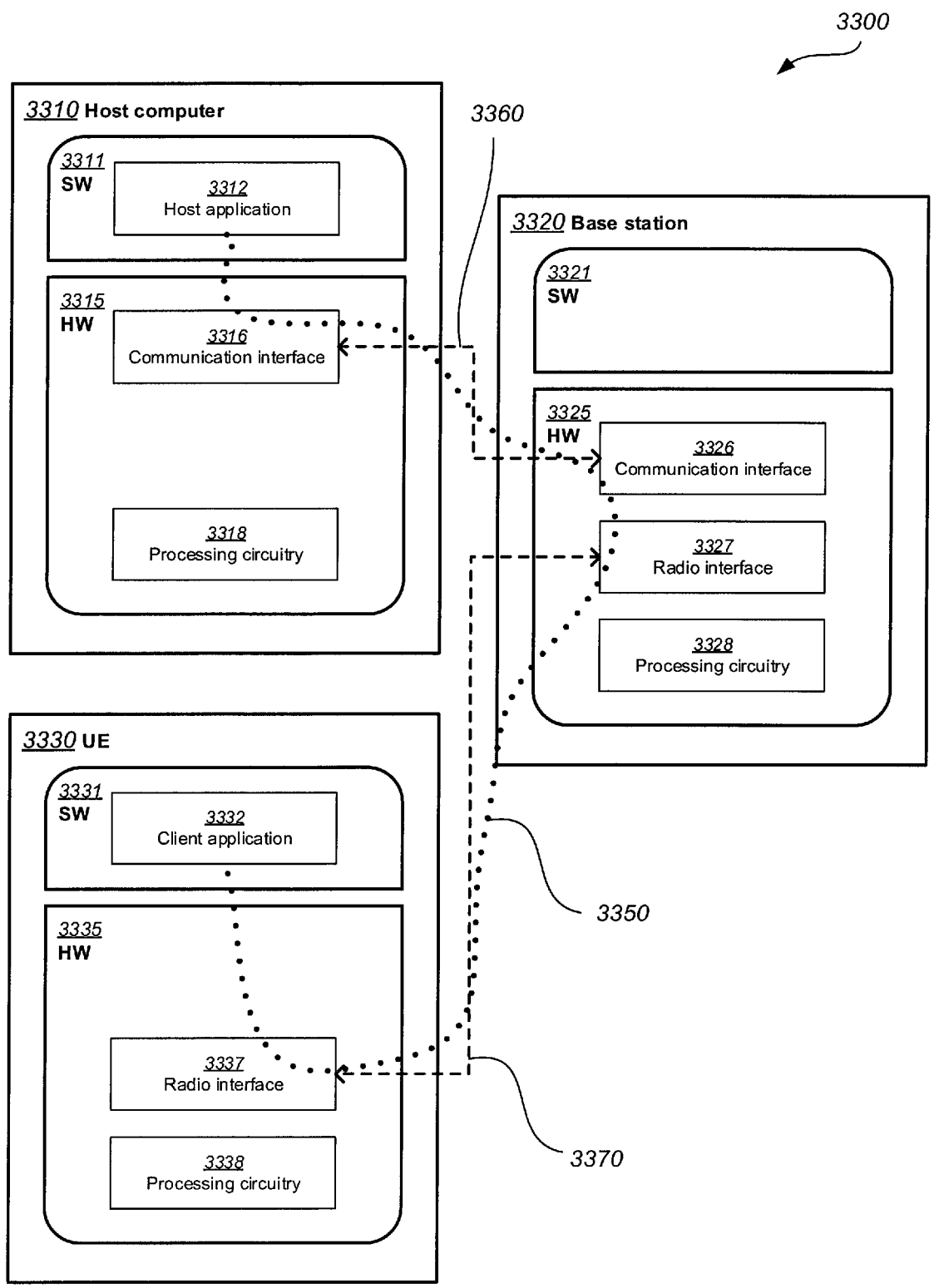
FIG. 15 is a generalized block diagram of a host computer communicating via a base station with a user equipment over a partially wireless connection.

It is noted that the host computer 3310, base station 3320 and UE 3330 illustrated in FIG. 15 may be identical to the host computer 3230, one of the base stations 3212a, 3212b, 3212c and one of the UEs 3291, 3292 of FIG. 14, respectively. This is to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may increase the Round-Trip Time (RTT) of transmission and thereby provide benefits such as improved latency of the ARQ process on the RLC layer.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 18, 19:
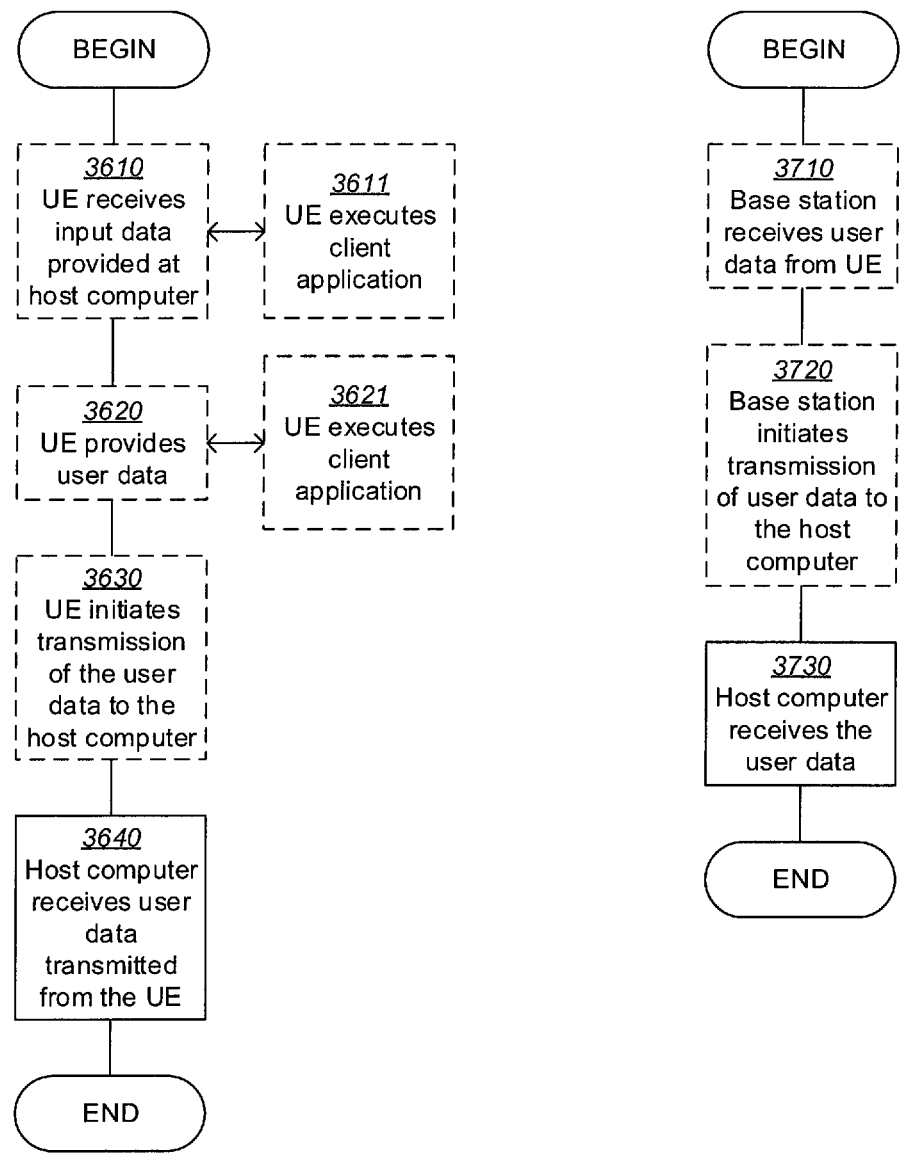

FIGS. 16 and 17 and the corresponding text are about a downstream aspect of the radio-related invention, while FIGS. 18 and 19 and the corresponding text discuss an upstream aspect.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2, 6, and 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

Below is further examples related to the aspects/embodiments as described above.

The user plane (UP) reliability relies heavily on residual error minimization at HARQ. In current LTE, to efficiently reduce residual error rate, two kinds of retransmission mechanisms were mainly introduced, i.e., hybrid-ARQ (HARQ) in MAC and ARQ in RLC. Retransmission of missed or erroneous data units are handled primarily by HARQ and complemented by ARQ. Such two-level retransmission structure conducts efficiency-reliability trade-off with fast (HARQ) and reliable (ARQ) feedbacks.

The HARQ mechanism was designed to target for very fast retransmission but with not very high ambition on minimizing block error rate (BLER) to reduce cost at physical control channel. Complementarily, RLC status reports are transmitted with relatively high robustness (reliability of $10^{-5}$ or even higher robustness) to eventually minimize the residual error rate at L2.

At present, for URLLC, one of the challenging demanding is ultra-low latency. A legacy ARQ retransmission (LTE-like waiting feedback triggering retransmission takes time) may render an unacceptable delay and it thus becomes almost invalid in URLLC cases. On the other hand, a legacy HARQ re-transmission relies on an error rate of feedback channel, which may result in an unacceptable residual error rate at L2. So the way forward is to enhance UP RLC ARQ and HARQ functionality to have a new tradeoff in reliability, latency, and efficiency per URLLC requirements, for which some possible aspects to consider as follows:

Improvement on HARQ: to improve reliability of HARQ feedback, either by reducing relaying on HARQ feedback, e.g., by using autonomous retransmission (i.e., TTI bundling) or enhancing HARQ feedback channel design, e.g., by adding CRC to secure the HARQ feedback; and Improvement on ARQ: to speed up ARQ Round-Trip Time (RTT), e.g., by allowing ARQ-level autonomous re-transmission(s) even before ARQ status PDU.

What is claimed is:

1. A method implemented in a second device, comprising:
detecting, on a radio link control, RLC, layer, whether a RLC packet is successfully received from a first device;
in response to failing to successfully receive the RLC packet, detecting the RLC packet from the first device on the RLC layer, without transmitting a negative acknowledgement, NACK, feedback for the RLC packet to the first device;
in response to successfully receiving the RLC packet, comparing a time length of a time interval from the receipt of the RLC packet to an expiration of a predetermined RLC retransmission period with a threshold time length; and
in response to determining that the time length of the time interval is greater than the threshold time length, transmitting an acknowledgment, ACK, feedback for the RLC packet to the first device.

2. The method of claim 1, wherein detecting the RLC packet from the first device comprises:
- detecting, on a media access control, MAC, layer, whether a MAC packet are successfully received, wherein the MAC packet is generated from the RLC packet and repeatedly transmitted on a MAC layer for a predetermined number of times;
- in response to successfully receiving the MAC packet, transmitting the MAC packet from the MAC layer to the RLC layer, without transmitting an ACK feedback for the MAC packet to the first device; and
- generating, on the RLC layer, the RLC packet based on the MAC packet.

3. The method of claim 2, further comprising:
- in response to failing to successfully receipt of the MAC packet, detecting a retransmission of the MAC packet on the MAC layer, without transmitting a NACK feedback for the MAC packet to the first device.

4. An apparatus at a second device, comprising:
a processor; and
a memory coupled to the processing unit and storing instructions thereon, the instructions, when executed by the processing unit, causing the apparatus to:
- detect, on a radio link control, RLC, layer, whether a RLC packet is successfully received from a first device;
- in response to failing to successfully receive the RLC packet, detect the RLC packet from the first device on the RLC layer, without transmitting a negative acknowledgement, NACK, feedback for the RLC packet to the first device;
- in response to successfully receiving the RLC packet, compare a time length of a time interval from the receipt of the RLC packet to an expiration of a predetermined RLC retransmission period with a threshold time length; and
- in response to determining that the time length of the time interval is greater than the threshold time length, transmit an acknowledgment, ACK, feedback for the RLC packet to the first device.

5. The apparatus of claim 4, wherein the instructions, when executed by the processing unit, cause the apparatus to:
- detect, on a media access control, MAC, layer, whether a MAC packet are successfully received, wherein the MAC packet is generated from the RLC packet and repeatedly transmitted on a MAC layer for a predetermined number of times;
- in response to successfully receiving the MAC packet, transmit the MAC packet from the MAC layer to the RLC layer, without transmitting an ACK feedback for the MAC packet to the first device; and
- generate, on the RLC layer, the RLC packet based on the MAC packet.

6. The apparatus of claim 5, wherein the instructions, when executed by the processing unit, further cause the apparatus to:
- in response to failing to successfully receipt of the MAC packet, detect a retransmission of the MAC packet on the MAC layer, without transmitting a NACK feedback for the MAC packet to the first device.

* * * * *